United States Patent
Han (10) Patent No.: US 7,447,005 B2
(45) Date of Patent: Nov. 4, 2008

(54) PORTABLE COMPUTER HAVING A DETACHABLE DISPLAY, THE DETACHABLE DISPLAY, AND A SUPPORTING DEVICE TO SUPPORT THE SAME

(75) Inventor: Duk-ho Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 106 days.

(21) Appl. No.: 11/434,882

(22) Filed: May 17, 2006

(65) Prior Publication Data

US 2006/0274058 A1 Dec. 7, 2006

(30) Foreign Application Priority Data

May 18, 2005 (KR) .................... 10-2005-0041637

(51) Int. Cl.
H05K 7/16 (2006.01)
(52) U.S. Cl. .................. 361/681; 361/683; 248/918; 345/204
(58) Field of Classification Search .......... 361/683, 361/682, 681; 248/918; 345/204
See application file for complete search history.

(56) References Cited

U.S. PATENT DOCUMENTS

| | | | | |
|---|---|---|---|---|
| 6,310,768 B1 * | 10/2001 | Kung et al. | ............. | 361/681 |
| 6,317,315 B1 * | 11/2001 | Lee et al. | ............. | 361/681 |
| 6,512,670 B1 * | 1/2003 | Boehme et al. | ............. | 361/681 |
| 6,882,529 B2 * | 4/2005 | Helot et al. | ............. | 361/686 |

FOREIGN PATENT DOCUMENTS

| | | |
|---|---|---|
| CN | 2396424 | 9/2000 |
| CN | 1114856 | 7/2003 |
| CN | 1122909 | 10/2003 |
| CN | 1130609 | 12/2003 |
| KR | 1999-17510 | 3/1999 |
| KR | 1999-32234 | 7/1999 |

OTHER PUBLICATIONS

Korean Office Action dated Jul. 14, 2006 issued in KR 2005-41637.
Chinese Office Action dated Jun. 29, 2007 issued in CN 2006100754860.

* cited by examiner

Primary Examiner—Jayprakash N Gandhi
Assistant Examiner—Ingrid Wright
(74) Attorney, Agent, or Firm—Stanzione & Kim, LLP (57) ABSTRACT

A portable computer includes a computer main body, a display to form an image, a coupling member tiltably coupled with the display, a projection holder provided in one of the computer main body and the coupling member, and a projection part provided on the other one of the computer main body and the coupling member to be detachably coupled to the projection holder. Thus, the portable computer has the display that is easily separated and coupled from/to the computer main body, and the display that is separated from the computer main body is tiltable.

29 Claims, 8 Drawing Sheets

PORTABLE COMPUTER HAVING A DETACHABLE DISPLAY, THE DETACHABLE DISPLAY, AND A SUPPORTING DEVICE TO SUPPORT THE SAME

CROSS-REFERENCE TO RELATED APPLICATIONS

This application claims the benefit of Korean Patent Application No. 2005-41637, filed on May 18, 2005 in the Korean Intellectual Property Office, the disclosure of which is incorporated herein in its entirety by reference.

BACKGROUND OF THE INVENTION

1. Field of the Invention

The present general inventive concept relates to a portable computer, and more particularly, to a portable computer having an improved coupling structure of a computer having a main body and a display.

2. Description of the Related Art

Conventionally, a portable computer includes a computer main body, a display for receiving an image signal from the computer main body and for forming an image, and a tilting hinge for connecting the display and the computer main body to tiltably couple the display with the computer main body.

A conventional portable computer is disclosed in Korean Patent Application No. 10-1997-040463. The conventional portable computer has a laptop computer main body, a Liquid Crystal Display (LCD) module for forming an image, a LCD module detachable part detachably coupled with the LCD module, and a hinge part for connecting the computer main body and the LCD module detachable part to make the LCD module detachable part tilt with respect to the computer main body.

An end side of the LCD module is provided with a first contact terminal and a coupling pin. The LCD module detachable part is formed with a second contact terminal coupled with the first contact terminal, and a plurality of grooves to couple with the coupling pin.

The plurality of grooves accommodates the coupling pin which is provided in the LCD module with various sizes.

Therefore, the conventional portable computer of a detachable display type may be used to selectively dispose LCD modules of various sizes selectively on the computer main body.

However, the conventional portable computer cannot use the display, which is separated from the computer main body, as a monitor. Particularly, the display that is separated from the computer main body is not provided with a hinge part, since the hinge part is disposed on the computer main body. As a result, the display, which is separated from the computer main body, cannot tiltably operate.

Further, in the conventional portable computer, there is a need for an improved coupling structure in which the display is easily separated and coupled from/to the computer main body, and unstable factors such as shaking that occurs when the display is combined with the computer main body can be prevented.

SUMMARY OF THE INVENTION

The present general inventive concept provides a portable computer in which a display is easily separated and coupled from/to a computer main body, and the display that is separated from the computer main body is tiltable.

The present general inventive concept also provides a portable computer in which a display that is separated from a computer main body may be used as a monitor to display images when the display is separated from the computer main body. The present general inventive concept also provides a detachable display and a supporting device to support the same.

Additional aspects of the present general inventive concept will be set forth in part in the description which follows and, in part, will be obvious from the description, or may be learned by practice of the present general inventive concept.

The foregoing and/or other aspects of the present general inventive concept are achieved by providing a portable computer, comprising a computer main body, a display to form an image, a coupling member tiltably coupled with the display, a projection holder provided in one of the computer main body and the coupling member, and a projection part provided on the other one of the computer main body and the coupling member to be detachably coupled to the projection holder.

The projection part may be accommodated in the projection holder and the projection holder may be provided with a locking member to couple and uncouple with the projection part that is accommodated in the projection holder.

The projection part may comprise a guide part, and the locking member may comprise a slide part to be slidably coupled to the guide part.

The guide part may comprise a guide rail depressed to make the slide part insertable along a lengthwise direction of the computer main body.

The locking member may further comprise a lever exposed outside the computer main body to operate the slide part to couple and uncouple with the guide rail.

The projection part may project from the coupling member, and the projection holder may be provided in the computer main body to accommodate the projection part therein.

The projection holder may open upwardly from the computer main body to make the projection part insertable therein from an upper side of the computer main body to a lower side thereof.

The projection part may comprise a connector, and the projection holder may comprise a connection port connectable with the connector.

The portable computer may further comprise an elastic member provided between the connection port and the projection holder such that the connection port is elastically movable in the projection holder.

The portable computer may further comprise a connecting cable to connect the connector and the connection port when the display is separated from the computer main body.

The portable computer may further comprise a display supporting device to support the display when the display is separated from the computer main body.

The display supporting device may comprise a stand, and a supporter provided on the stand and having at least one of the projection part and the projection holder to support the display thereon.

The foregoing and/or other aspects of the present general inventive concept are also achieved by providing a portable computer, comprising a computer main body, a display to receive one or more image signals from the computer main body, and at least one coupling member tiltably disposed on a lower end of the display and having at least one connector that extends from the at least one coupling member and is connectable to and disconnectable from the computer main body.

The foregoing and/or other aspects of the present general inventive concept are also achieved by providing a portable computer, comprising a main body, a display having a coupling member that removably couples to the main body, and a connecting part to connect the main body with the display and to provide one or more image signals to the display when the display is decoupled from the main body and is separated therefrom.

The foregoing and/or other aspects of the present general inventive concept are also achieved by providing a display device attachable to and detachable from a portable computer main body, the device comprising a display to receive image signals from the portable computer main body, and at least one coupling member tiltably disposed on a lower end of the display and having at least one connector that extends from the at least one coupling member and is connectable to and disconnectable from the portable computer main body.

The foregoing and/or other aspects of the present general inventive concept are also achieved by providing a supporting device, comprising a base part disposable on a flat surface, and a stand part having a supporter to rotatably support a display that is decoupled from a corresponding portable computer main body such that the display is hingeably supported thereby to display one or more images received from the corresponding portable computer.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Figure 1:
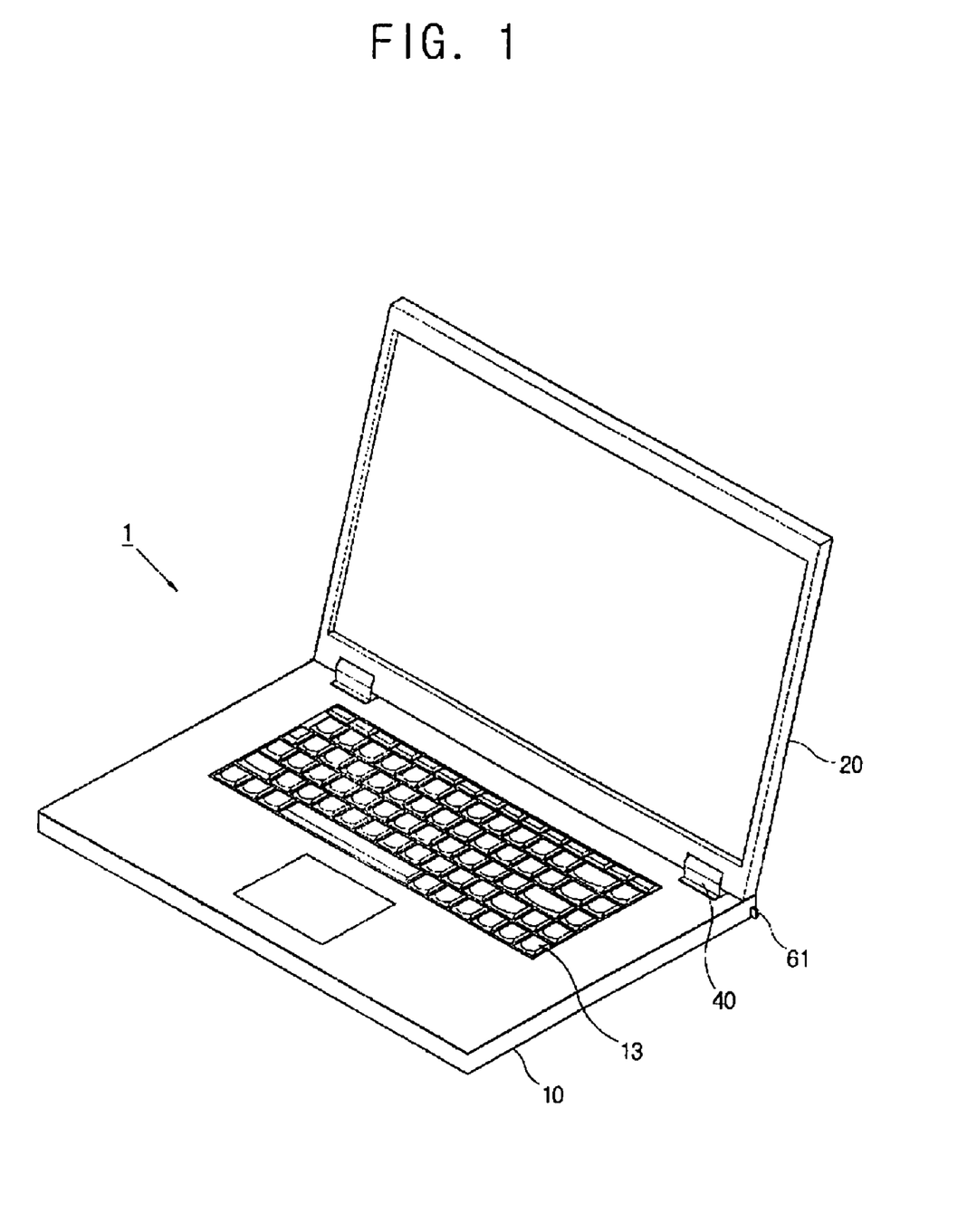
FIG. 1 is a perspective view illustrating a portable computer according to an embodiment of the present general inventive concept.
Figure 2:
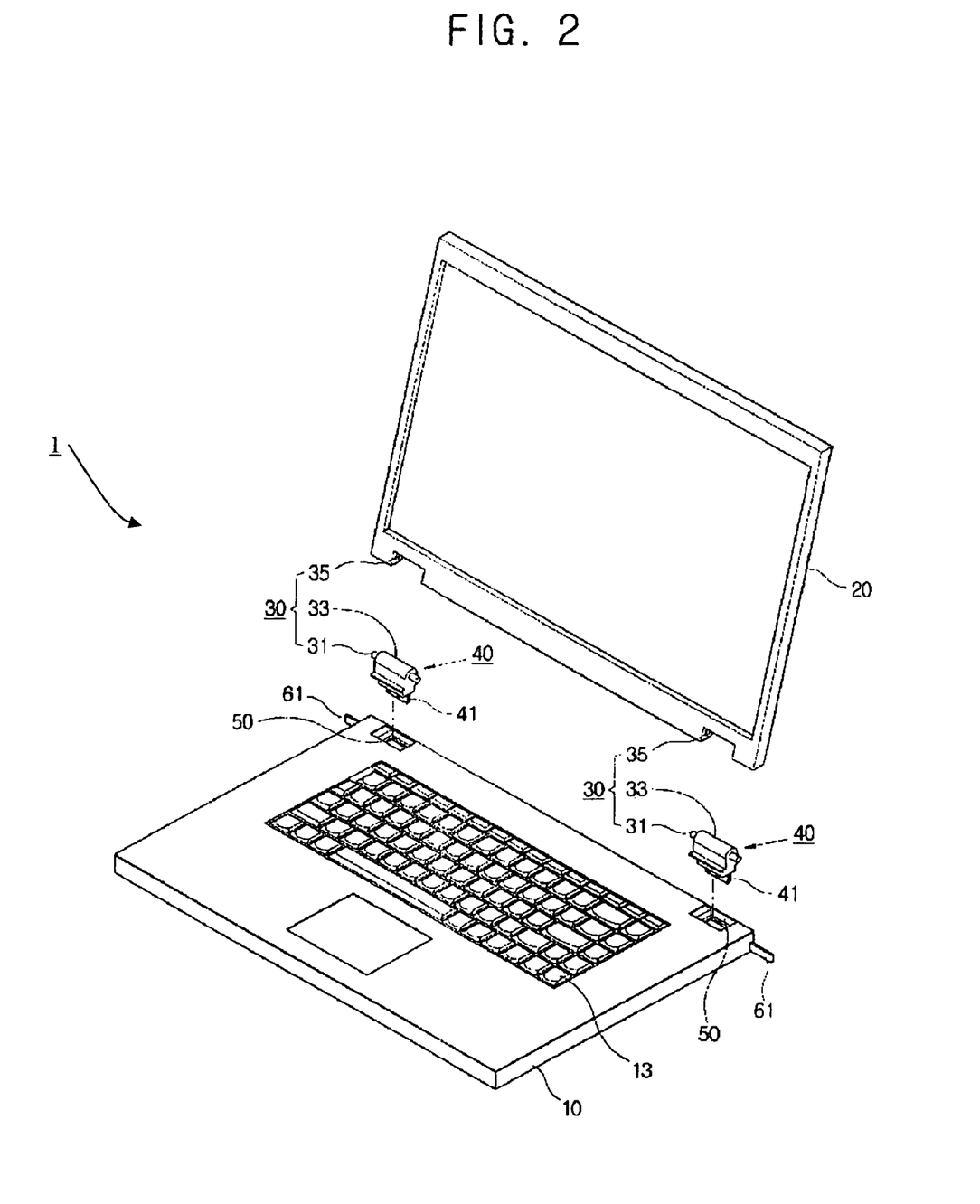
FIG. 2 is an exploded perspective view illustrating the portable computer of FIG. 1.

FIG. 1 is a perspective view illustrating a portable computer 1 according to an embodiment of the present general inventive concept, and FIG. 2 is an exploded perspective view of the portable computer 1 of FIG. 1.

The portable computer 1 comprises a computer main body 10, a display 20 to form an image, a coupling member 40 tiltably coupled with the display 20, a projection holder 50 provided in one of the computer main body 10 and the coupling member 40, and a projection part 41 provided on the other one of the computer main body 10 and the coupling member 40 so as to be detachably coupled to the projection holder 50. For example, the projection holder 50 may be disposed in the computer main body 10, and the projection part 41 may be disposed on the coupling member 40.

Referring to FIGS. 1 and 2, the computer main body 10 can be situated on a horizontal surface such as a table. The computer main body 10 comprises a main board and a Central Processing Unit (CPU) which are disposed therein to form the image signal, etc., and a key board 13 provided on an upper side thereof to input data.

Referring to FIGS. 1 and 2, the display 20 receives the image signal to form the image. The display 20 is provided with a driving part (not shown) so as to receive the image signal and form the image. The display 20 may be an LCD panel, which is thin and light weight, to form the image. Alternatively, the display 20 may be a flat display panel such as a Plasma Display Panel (PDP). The display 20 is tiltably coupled to a hinge shaft 31 of a hinge part 30 to tilt with respect to the coupling member 40.

Referring to FIG. 2, the hinge part 30 supports the display 20 and the coupling member 40 to make the display 20 tilt about an axis line of a horizontal direction with respect to the coupling member 40. The hinge part 30 comprises the hinge shaft 31 provided between the display 20 and the coupling member 40, a shaft supporter 33 provided in the coupling member 40 to support and accommodate the hinge shaft 31, and a shaft holder 35 provided in the display 20 in which to tiltably insert ends of the hinge shaft 31. Therefore, the display 20 tilts about the hinge shaft 31 of the hinge part 30, thereby being rotatable toward the computer main body 10, or being rotatable from the computer main body 10 to form a predetermined angle with respect to the computer main body 10.

The coupling member 40 may include a pair of coupling members 40 disposed on opposite sides of the computer main body 10 at a lower end of the display 20. That is, the hinge shaft 31 has the axis line of the horizontal direction, and may include a plurality of hinge shafts 31 to connect the opposite sides of the lower end side of the display 20 with the computer main body 10.

The shaft holder 35 is tiltably coupled with the ends of the hinge shaft 31 with a frictional force. Accordingly, when a user rotates the display 20 with respect to the computer main body 10, the user applies a force to the display 20 that is greater than the frictional force between the shaft holder 35 and the hinge shaft 31.

Figure 3:
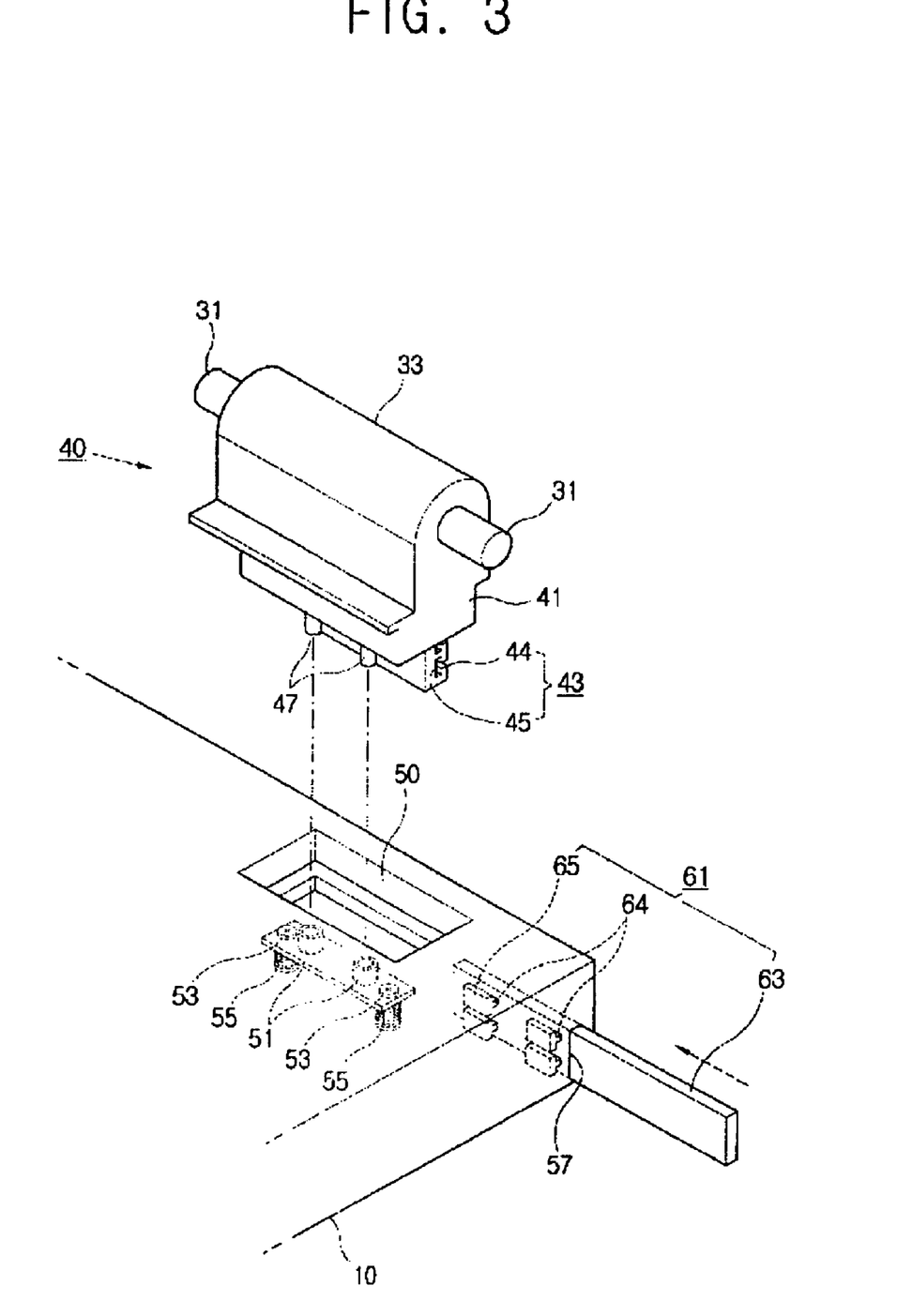
FIG. 3 is a partially exploded perspective view illustrating the portable computer of FIG. 1.
Figure 4:
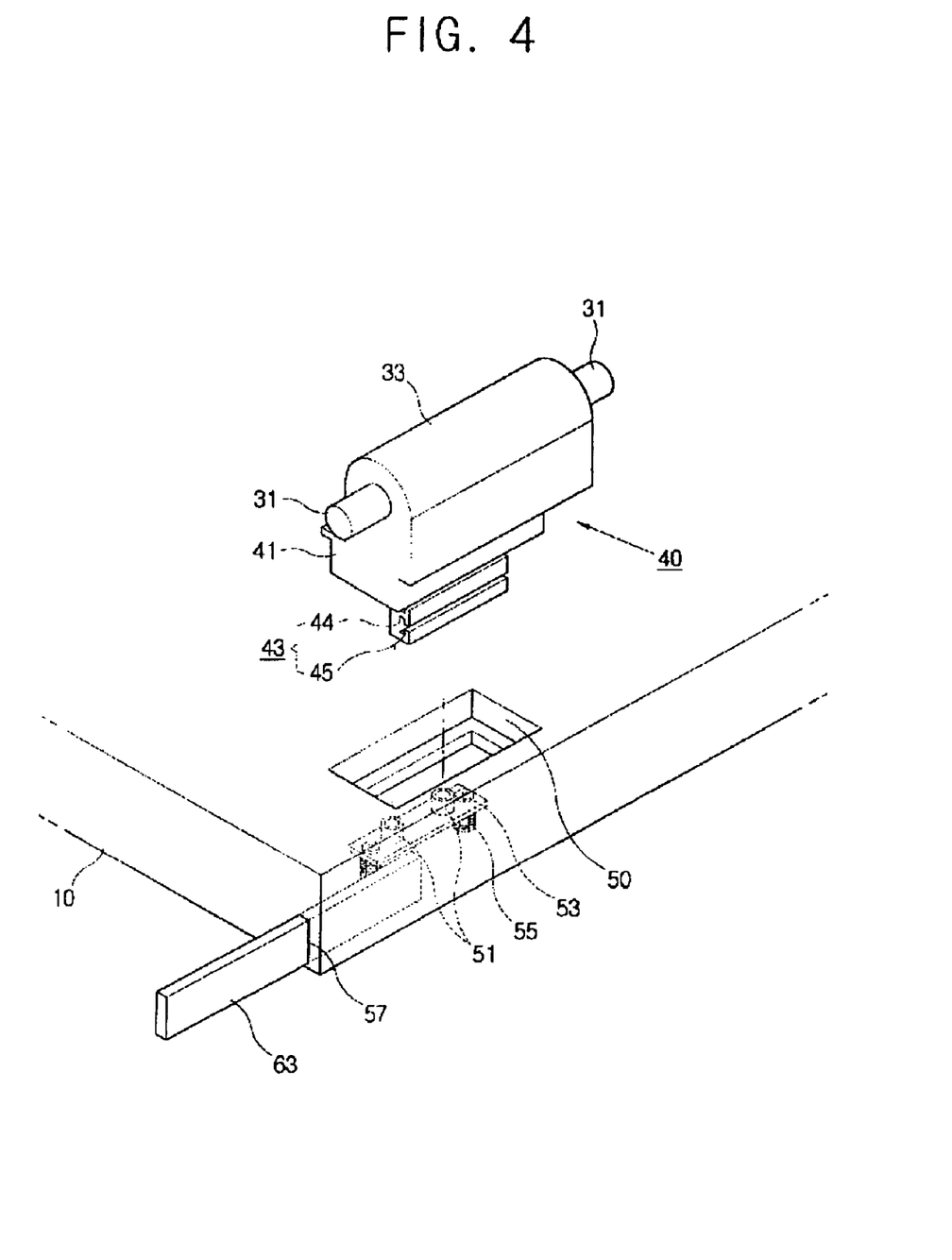
FIGS. 4 and 5 are perspective views illustrating a coupling member of the portable computer of FIG. 1 according to an embodiment of the present general inventive concept.

Referring to FIGS. 3 and 4, the coupling member 40 is couplable to and separable from the computer main body 10. The coupling member 40 comprises the projection part 41 to be inserted into the projection holder 50, and a connector 47 that is connectable to a connection port 51 in the projection holder 50. The pair of coupling members 40 are disposed at the opposite sides of the lower end side of the display 20, respectively.

Referring to FIGS. 3 and 4, the projection part 41 projects from a lower side of the shaft supporter 33 to be accommodated in the projection holder 50. The projection part 41 may be provided as a rectangular sectional shape on the display 20 to correspond to the projection holder 50. Alternatively, the projection part 41 may be other shapes such as a circular section, or the like. The projection part 41 is provided with a guide part 43 which couples and uncouples with a locking member 61 (refer to FIG. 3) disposed in the computer main body 10.

The guide part 43 comprises a guide rail 44, which is recessed along a lengthwise direction of the projection part 41 to accommodate a slide part 64 of the locking member 61. The guide part 43 further comprises a hook 45, which is provided outside the guide rail 44 to prevent the slide part 64 on the locking member 61 from being separated (refer to FIG. 4) from the guide rail 44 on the projection part 41. The guide part 43 may include a pair of guide parts 43 disposed at a bottom of the projection part 41. Alternatively, the guide part 43 may include more than three guide parts 43.

Referring to FIG. 3, the connector 47 supplies electric power and the image signal to the display 20. In the case where an antenna (not shown) is disposed inside the display 20, the connector 47 may transfer an antenna signal to the computer main body 10, etc. The connector 47 is provided in the coupling member 40 to couple with the connection port 51. The projection part 41 may include a pair of projection parts 41 disposed at opposite ends of the computer main body 10, and the connector 47 may include a pair of connectors 47 disposed on the pair of projection parts 41, respectively. One of the connectors 47 may be used to supply the electric power and the image signal, and the other one of the connectors 47 may be used to transfer the antenna signal. Alternatively, the connector 47 may be provided in one of the projection parts 41.

Referring to FIGS. 3 and 4, the projection holder 50 is recessed in the computer main body 10 to accommodate and couple the projection part 41. The projection holder 50 may open upwardly at a rear area of the computer main body 10 to accommodate the projection part 41 therein. Therefore, the projection part 41 is couplable to and separable from the projection holder 50 by moving the display 20 in upward and downward directions thereof (refer to FIGS. 3 and 4). Alternatively, the projection holder 50 may open in a rearward direction at the rear area of the computer main body 10 to accommodate the projection part 41 therein. The projection holder 50 is provided with the locking member 61 to couple and uncouple with the projection part 41, which is accommodated into the projection holder 50. The projection holder 50 is provided with the connection port 51 to couple with the connector 47.

Referring to FIGS. 3 and 4, the locking member 61 is slidably provided in the computer main body 10 to couple and uncouple with the guide part 43 of the projection part 41. The locking member 61 comprises a lever 63 having a long bar shape, and the slide part 64 projecting from a side of the lever 63 to be inserted into the guide rail 44.

The lever 63 is accommodated into a lever receiver 57 provided in the computer main body 10 and is slidably guided therein. Accordingly, the user can hold the side of the lever 63 and move the locking member 61 along a lengthwise direction of the lever 63. The side of the lever 63 may be provided with a handle (not shown) to provide the user with a better grip.

A plurality of slide parts 64 are disposed on the lever 63 and are inserted into the guide rail 44. An end side of the slide part 64 is provided with a protrusion 65, which is hooked by the hook 45 of the guide part 43 to prevent the slide part 64 from being separated from the guide rail 44.

Referring to FIGS. 3 and 4, the connection port 51 is disposed in the projection holder 50 to be coupled to the connector 47 when the projection part 41 is disposed therein. The connection port 51 may be disposed in the projection holder 50 using a screw 53. An elastic member 55 may be provided between the connection port 51 and the projection holder 50 to elastically couple the connection port 51 to the projection holder 50.

The elastic member 55 may be a coil spring to accommodate the screw 53. Accordingly, the elastic member 55 absorbs a coupling shock when the connector 47 is coupled to the connection port 51, and the elastic member 55 elastically moves the connection port 51 in the projection holder 50 and prevents the connection port 51 from breaking when the projection part 41 is moved with respect to the projection holder 50. However, it should be understood that the elastic member 55 is not limited to the coil spring, and the elastic member 55 may be other various types such as a rubber material, a leaf spring, or the like, to supply elastic force. The elastic member 55 may have a predetermined force applied by the connector 47 when the projection part 41 is accommodated into the projection holder 50, and when the projection part 41 and the projection holder 50 are coupled by the locking member 61. Therefore, the elastic material 55 can bias the projection part 41 away from the projection holder 50 by the elastic force such that when the guide part 43 of the projection part 41 is separated from the locking member 61 the elastic force aids in the separation of the display 20 from the computer main body 10.

With this configuration, operation of the portable computer 1 according to the present embodiment will now be described below.

Figure 5:
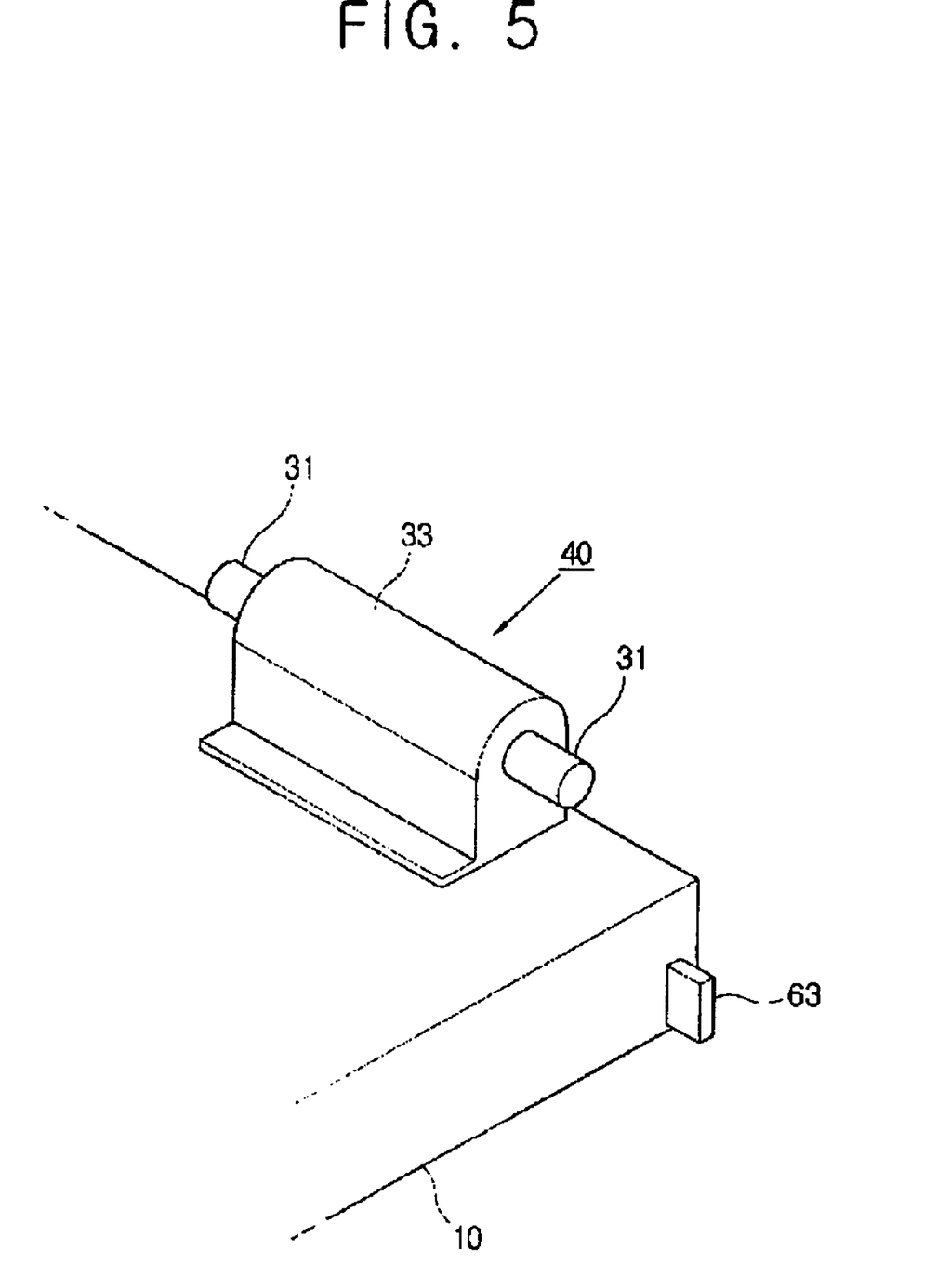

Referring to FIGS. 3 and 4, the projection part 41 provided in the coupling member 40 is separated from the projection holder 50. The projection part 41 of the coupling member 40 is inserted into the projection holder 50 such that the connector 47 provided on the projection part 41 is coupled to the connection port 51. The user can then insert the lever 63 of the locking member 61 into the lever receiver 57 to couple the slide part 64 to the guide rail 44 (refer to FIGS. 4 and 5). Accordingly, the projection part 41 of the coupling member 40 is coupled to the projection holder 50. Therefore, the user can easily couple the display 20 to the computer main body 10 by inserting (e.g., by pressing) the lever 63 of the locking member 61 after accommodating the projection part 41 in the projection holder 50.

Further, an operation by which the projection part 41 of the coupling member 40 is separated from the projection holder 50 will now be described below. The user can pull the lever 63 of the locking member 61 from the lever receiver 57 to separate the slide part 64 of the locking member 61 from the guide rail 44. Accordingly, the connecter 47, which forces the elastic member 55 downward and is coupled to the connection port 51, is forced upward by the elastic force of the elastic member 55 such that the projection part 41 is easily separated from the projection holder 50.

Therefore, the display 20 may be easily and stably coupled to the computer main body 10 as the user couples the projection part 41 provided in the coupling member 40 to the projection holder 50 and then moves the locking member 61 to couple to them.

Further, the elastic member 55 prevents the connection port 51 and the connector 47 from being damaged such that the projection part 41 is easily separated from the projection holder 50.

Figure 6:
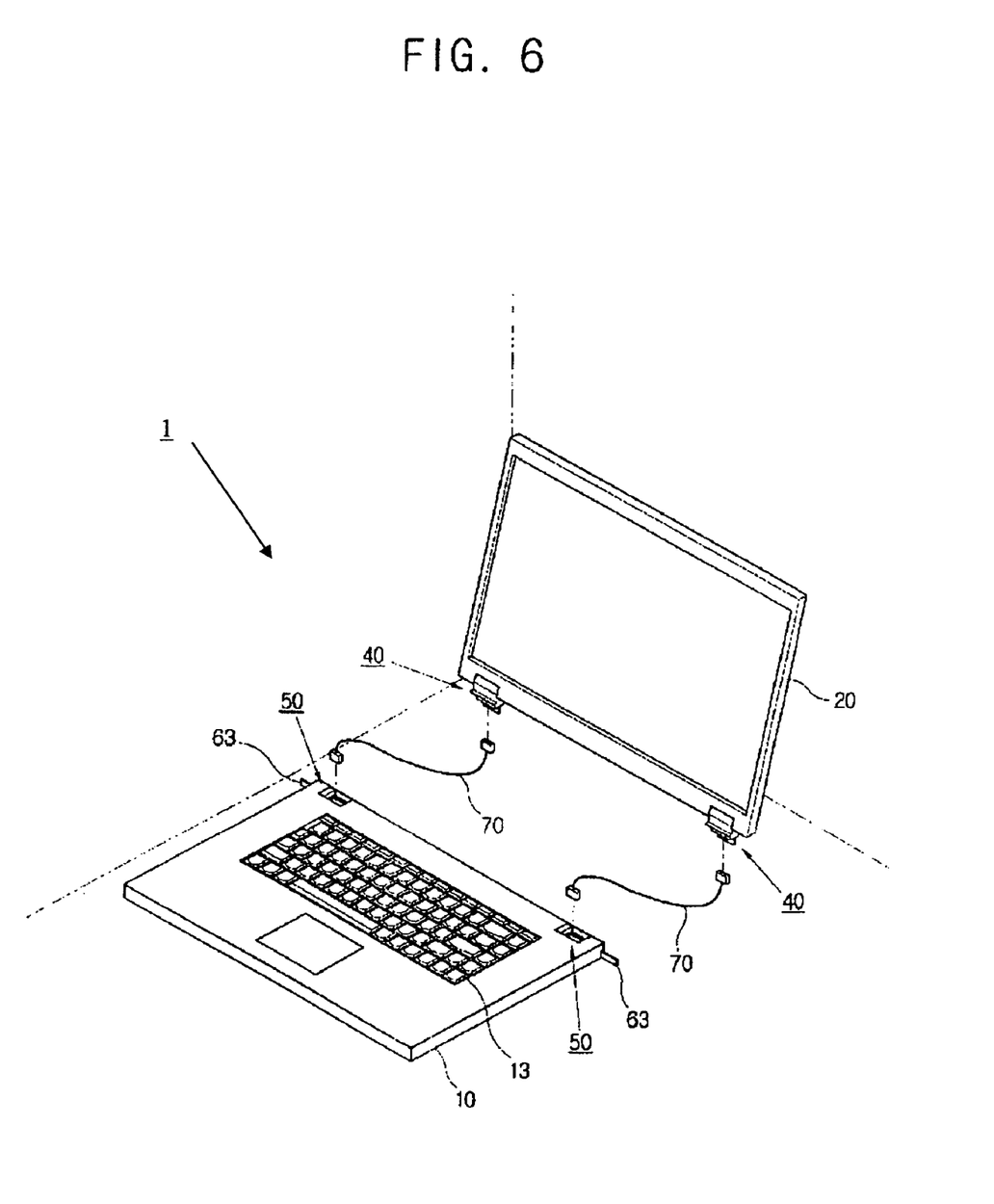
FIG. 6 is a perspective view illustrating a state in which a display of the portable computer of FIG. 1 is separated from a computer main body according to another embodiment of the present general inventive concept.

FIG. 6 is a perspective view illustrating a state in which the display 20 of the portable computer 1 is separated from the computer main body 10 according to another embodiment of the present general inventive concept. The portable computer 1 according to the present embodiment may further comprise a connecting cable 70 to connect the connector 47 and the connection port 51 when the display 20 is separated from the computer main body 10.

A first end of the connecting cable 70 is connected with the connector 47 provided on the projection part 41, and a second end of the connecting cable 70 is connected to the connection port 51 provided in the projection holder 50. Therefore, when the display 20 is separated from the computer main body 10, the display 20 and computer main body 10 remain connected by the connecting cable 70, so that the display 20 that is separated from the computer main body 10 may continue to be used as a respective monitor and can be disposed at various positions such as a wall. However, it should be understood that the first end of the connecting cable 70 is connected with the connector 47, and the second end thereof may be connected with a connection port provided in another computer system (not shown). In other words, the separated display 20 may be connected to different computer systems (not shown) besides the computer main body 10 and may be used accordingly. Although FIG. 6 illustrates that the connecting cable 70 connects the coupling member 40 of the display 20 with the projection holder 50 of the computer main body 10, it should be understood that in some applications, the computer main body 10 may alternatively communication with the display 20 wirelessly.

Figure 7:
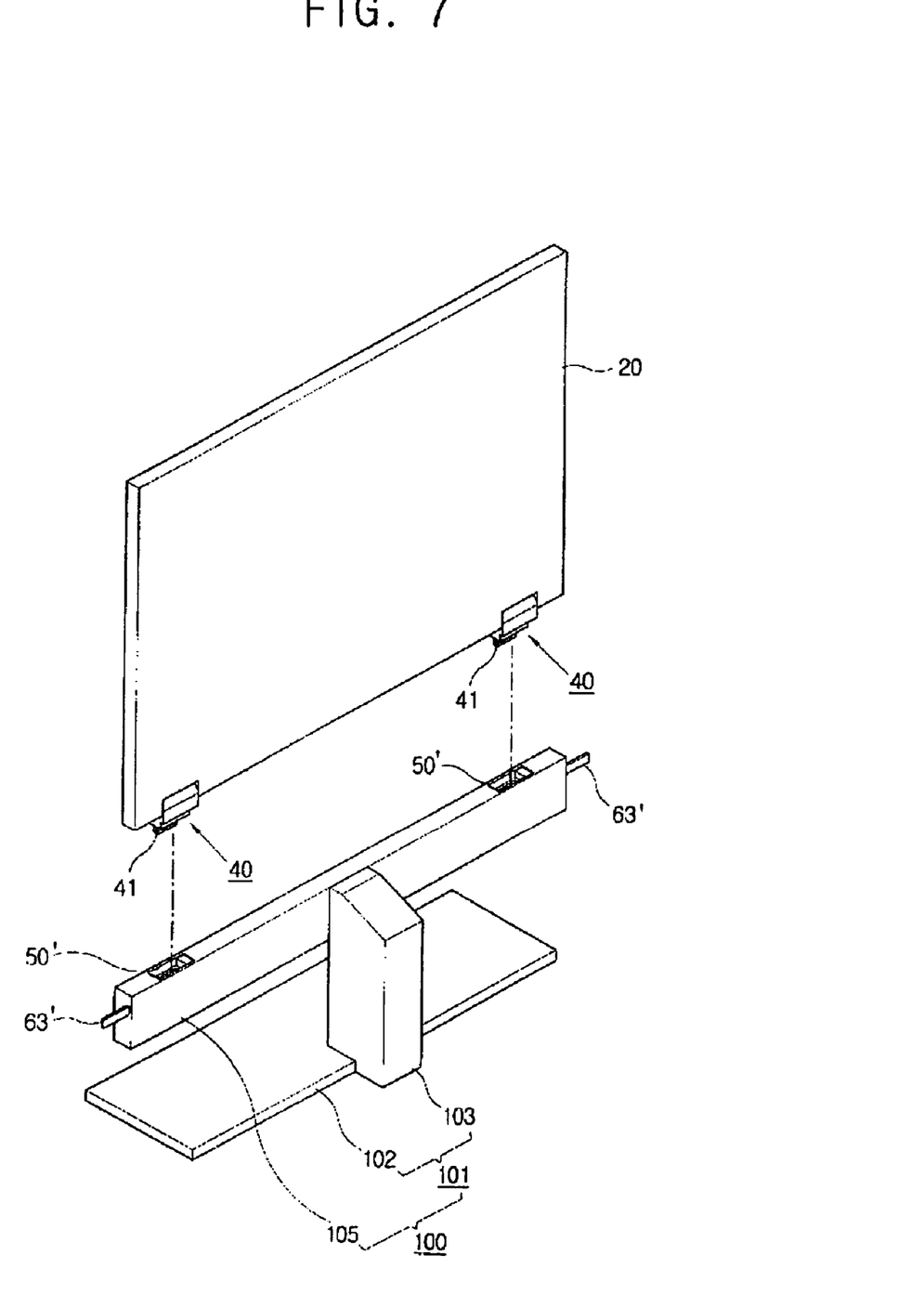
FIGS. 7 and 8 are perspective views illustrating states in which the display is separated from the portable computer and is coupled to a display supporting device according to another embodiment of the present general inventive concept.
Figure 8:
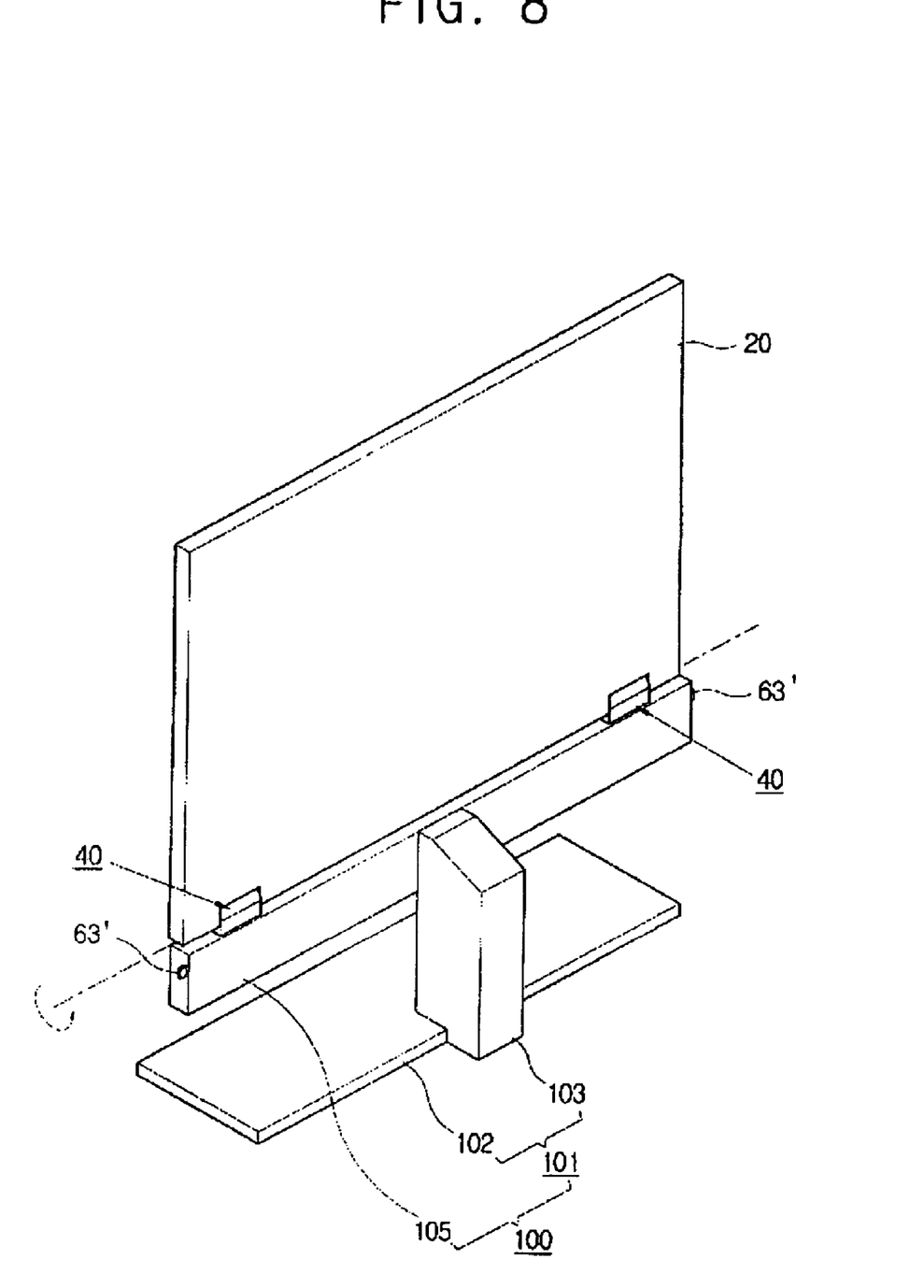

FIGS. 7 and 8 are perspective views illustrating a state in which the display 20 is separated from the portable computer 1 and is coupled to a display supporting device 100 according to another embodiment of the present general inventive concept.

The display supporting device 100 comprises a stand 101, and a supporter 105 provided on the stand 101. The supporter 105 is provided with a projection holder 50' (similar to FIGS. 2-4 and 6) which detachably couples with the projection part 41 of the coupling member 40 that is coupled to the display 20.

The stand 101 comprises a base part 102 stably situated on a horizontal surface, and a stand part 103 extending upward from the base part 102 to support the supporter 105. The stand 101 is provided with a socket (not shown) which is connected with the computer main body 10 or a different computer system (not shown) to send and receive the electric power and the image signal to and from the display 20.

The supporter 105 is coupled to the stand part 103 to support the display 20. The supporter 105 is provided with the projection holder 50' and a locking member (not shown) including a lever 63' (similar to FIGS. 3-6) to detachably couple with the coupling member 40. The locking member of the present embodiment may be similar to the locking member 61 of FIGS. 1 and 2.

With this configuration, the display 20 can be separated from the computer main body 10, and then the projection 41 that is provided on the display 20 is accommodated into the projection holder 50' that is provided in the supporter 105. The locking member is moved using the lever 63', and the projection part 41 is coupled to the projection holder 50'.

Accordingly, referring to FIGS. 7 and 8, the display 20 can be separated from the computer main body 10 and coupled to the respective display supporting device 100 to be used as the monitor. A hinge part (not shown) may be provided between the display 20 and the coupling member 40 such that the display 20 is tiltable by the hinge part in the state in which the display 20 is coupled to the display supporting device 100. The hinge part of the present embodiment may be similar to the hinge part 30 of FIG. 2.

Accordingly, when the display 20 malfunctions or becomes defective, the user can easily separate the display 20 from the computer main body 10, and can then replace the display 20 with a different display.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable computer, comprising:
   a computer main body;
   a display to form an image;
   a coupling member tiltably coupled with the display;
   a projection holder provided in one of the computer main body and the coupling member;
   a projection part provided on the other one of the computer main body and the coupling member to be detachably coupled to the projection holder, the projection part comprising a guide part and at least one electrical connector to provide one or more image signals to the display when the display is coupled to or separated from the computer main body; and
   a locking member comprising a slide part to be slidably coupled to the guide part to couple and uncouple the display to the main body.

2. The portable computer according to claim 1, wherein the projection part is accommodated in the projection holder and the locking member couples and uncouples the projection part that is accommodated in the projection holder.

3. The portable computer according to claim 1, wherein the guide part comprises a guide rail recessed such that the slide part is insertable therein along a lengthwise direction of the computer main body.

4. The portable computer according to claim 3, wherein the locking member comprises a lever exposed outside the computer main body to operate the slide part to couple and uncouple with the guide rail.

5. The portable computer according to claim 1, wherein the projection part projects from the coupling member, and the projection holder is provided in the computer main body to accommodate the projection part.

6. The portable computer according to claim 5, wherein the projection holder opens upwardly from the computer main body such that the projection part is insertable therein from an upper side of the computer main body to a lower side thereof.

7. The portable computer according to claim 1, wherein:
   the projection holder comprises a connection port that is connectable with the electrical connector.

8. The portable computer according to claim 7, further comprising:
   an elastic member provided between the connection port and the projection holder such that the connection port is elastically movable in the projection holder.

9. The portable computer according to claim 7, further comprising:
   a connecting cable to connect the electrical connector and the connection port when the display is separated from the computer main body.

10. The portable computer according to claim 1, further comprising:
    a display supporting device to support the display when the display is separated from the computer main body.

11. The portable computer according to claim 10, wherein the display supporting device comprises:
    a stand; and
    a supporter provided on the stand and having one of the projection part and the projection holder to support the display thereon.

12. A portable computer, comprising:
    a computer main body;
    a display to receive one or more image signals from the computer main body;
    at least one coupling member tiltably disposed on a lower end of the display and having at least one electrical connector that extends from the at least one coupling member and is connectable to and disconnectable from the computer main body;

a guide part formed in the computer main body; and at least one locking member comprising at least one slide part to be slidably coupled to the guide part to couple and uncouple the display to the main body.

13. The portable computer according to claim 12, wherein the at least one electrical connector of the at least one coupling member is connectable to and disconnectable from different computer main bodies.

14. The portable computer according to claim 12, further comprising:

a connecting cable to connect the at least one electrical connector of the at least one coupling member to the computer main body whenever the at least one coupling member of the display is disconnected from the computer main body.

15. The portable computer according to claim 12, further comprising:

a supporting device to support the at least one coupling member of the display when the at least one coupling member of the display is disconnected from the computer main body such that the display is rotatable about the at least one coupling member with respect to the supporting device.

16. The portable computer according to claim 12, wherein:

the display comprises at least one shaft holder disposed at the lower end thereof; and the at least one coupling member comprises:

a shaft supporter, a hinge shaft extending through the shaft supporter in the at least one shaft holder at the lower end of the display, and one or more connection terminals extending from the shaft supporter to be connectable with one or more corresponding terminals in the computer main body.

17. The portable computer according to claim 12, wherein:

the computer main body comprises at least one projection holder; and the at least one coupling member includes at least one projection part extending therefrom to be coupled in the at least one projection holder at the computer main body.

18. The portable computer according to claim 17, wherein the at least one projection holder opens upward from an upper surface of the computer main body and the at least one projection part extends downward from the at least one coupling member to be insertable in the at least one projection holder.

19. The portable computer according to claim 18, wherein:

the at least one locking member disposed on the computer main body and being movable between a first position to lock the at least one projection part in the at least one projection holder and a second position to enable the at least one projection part to be removed from the at least one projection holder.

20. The portable computer according to claim 19, wherein:

the at least one projection part includes the a guide part having one or more guide rails extending along the at least one projection part; and the at least one locking member comprises a lever receiving hole disposed in the computer main body, a lever insertably disposed in the lever receiving hole to be movable therein, and the one or more slide parts disposed on the lever to engage the one or more guide rails when the lever is moved inward in the lever receiving hole such that the at least one locking member is in the first position.

21. The portable computer according to claim 18, wherein the at least one projection holder comprises at least one connection port therein to connect to the at least one electrical connector of the at least one coupling member when the at least one projection part is inserted into the at least one projection holder.

22. The portable computer according to claim 21, wherein the at least one projection holder further comprises at least one elastic member disposed between the at least connection port and an inner surface of the at least one projection holder to enable the at least one connection port to be movable within the at least one elastic member.

23. A portable computer, comprising:

a main body;

a display having a coupling member tiltably disposed on a lower end of the display to removably couple the display to the main body; and a connecting part to electrically connect and physically latch the main body to the display when the display is coupled to the main body and to provide one or more image signals to the display when the display is decoupled from the main body and is separated therefrom.

24. A display device attachable to and detachable from a portable computer main body, the device comprising:

a display to receive image signals from the portable computer main body; and at least one coupling member tiltably disposed on a lower end of the display and having at least one connector that extends from the at least one coupling member to electrically connect and physically latch the main body to the display when the display is coupled to the main body and to provide one or more image signals to the display when the display is decoupled from the main body and is separated therefrom.

25. The display device according to claim 24, further comprising:

a supporting device to support the display and having at least one signal port disposed thereon to be connectable to the at least one connector of the at least one coupling member such that the display is rotatably supported with respect to the supporting device.

26. The display device according to claim 25, wherein the supporting device comprises:

a base part disposable on an installation surface;

a stand extending vertically from the base part; and a supporter extending horizontally at an upper end of the stand and having the at least one signal port to be connected to the at least one connector of the at least one coupling member of the display.

27. The display device according to claim 24, further comprising:

a connecting cable to maintain a connection between the display and the computer main body when the display is not connected to the portable computer main body.

28. The display device according to claim 24, further comprising:

at least one hinge part to support the display and the at least one coupling member to make the display tilt about a horizontal axis with respect to the at least one coupling member.

29. A supporting device, comprising:

a base part disposable on a flat surface; and a stand part having a supporter to rotatably support a display that is decoupled from a corresponding portable computer main body such that the display is hingeably supported thereby to display one or more images received from the corresponding portable computer, wherein the supporter comprises one or more projection holders to be electrically and physically coupled with one or more projection parts of the display when the display is coupled thereto.

* * * * *